United States Patent [19]
Townsend et al.

[11] Patent Number: 6,142,563
[45] Date of Patent: Nov. 7, 2000

[54] VEHICLE SEAT WITH ENERGY ABSORBING DEFORMABLE STRUCTURAL MATERIAL

[75] Inventors: John A. Townsend; Mohamed El-Sayed, both of Bloomfield Hills, Mich.

[73] Assignee: Joalto Design, Southfield, Mich.

[21] Appl. No.: 09/169,103

[22] Filed: Oct. 9, 1998

[51] Int. Cl.$^7$ ....................................................... B60N 2/42
[52] U.S. Cl. .................................. 297/216.1; 297/216.13; 297/411.2
[58] Field of Search ........................... 297/216.1, 216.12, 297/216.13, 216.14, 411.2

[56] References Cited

U.S. PATENT DOCUMENTS

| | | | |
|---|---|---|---|
| 3,400,979 | 9/1968 | James .................................. | 297/411.21 |
| 3,647,168 | 3/1972 | Eggert, Jr. et al. .................. | 297/248 X |
| 4,109,959 | 8/1978 | Barecki et al. . | |
| 4,296,967 | 10/1981 | Vogel .............................. | 297/452.55 X |
| 4,526,421 | 7/1985 | Brennan et al. ......................... | 297/232 |
| 4,630,864 | 12/1986 | Toll .................................. | 297/216.1 X |
| 4,898,426 | 2/1990 | Schulz et al. ....................... | 297/452.65 |
| 4,900,084 | 2/1990 | Förster et al. . | |
| 5,224,755 | 7/1993 | Beroth . | |
| 5,306,066 | 4/1994 | Saathoff . | |
| 5,769,489 | 6/1998 | Dellanno ......................... | 297/216.12 X |
| 5,836,547 | 11/1998 | Koch et al. ..................... | 297/216.12 X |

*Primary Examiner*—Peter R. Brown
*Attorney, Agent, or Firm*—Rader, Fishman, & Grauer PLLC

[57] ABSTRACT

A vehicle seat includes a generally horizontal sitting portion connected to a generally vertical backrest, and an armrest connected to the sitting portion or the armrest. At least one of the sitting portion, the backrest, or the armrest includes a plastically deformable cellular structural material arranged therein. Another embodiment is an armrest for a vehicle seat including an elastically deformable cushion material and a plastically deformable cellular structural material. A further embodiment is a vehicle seat including a sitting portion connected to a backrest, and an armrest connected to at least one of the sitting portion and the backrest. The armrest includes an elastically deformable cushion material and a plastically deformable cellular structural material. A variation of the armrest includes a barrier interposed between the cushion material and the cellular structural material. The sitting portion and the backrest each include plastically deformable cellular structural material arranged therein. For each embodiment, the cellular structural material includes at least one hollow cell having walls disposed normal to the direction a side impact force acts during a collision, whereby the cellular structural material absorbs energy as it is permanently deformed during a collision.

22 Claims, 3 Drawing Sheets

VEHICLE SEAT WITH ENERGY ABSORBING DEFORMABLE STRUCTURAL MATERIAL

BACKGROUND OF THE INVENTION

1. Field of the Invention

The invention relates to vehicle seating and, more particularly, to a seat including energy-absorbing deformable structural material for dissipating the force of a side impact collision.

2. Related Art

Efforts have long been made to improve the crash worthiness of transportation vehicles in order to minimize the severity of injuries to occupants. One particular emphasis has been to provide a seat that is capable of absorbing impact energy in a controlled manner so as to reduce or prevent the occurrence of and the severity of injuries to the occupants. These attempts include strengthened seat frames, seat frames including springs or other biasing elements to control movement of the seat upon impact with the vehicle, or seat frames including an encapsulated deformation element permitting breakaway movement of the seat from the frame upon exertion of a pre-determined force. These seats require relatively complex seat frame designs, which include relatively complex constructions and bulkiness, and therefore suffer from a relatively high cost of manufacture and installation. Further, many of these seats are not aesthetically pleasing.

A need exists for an improved vehicle seat that is capable of absorbing the energy of impact in a collision to thereby reduce or eliminate injury to occupants. Preferably, such a seat is aesthetically pleasing and is readily adaptable to a variety of existing vehicle structures while maintaining relative ease of installation and manufacture and requiring only minimal or no increase in cost when compared to presently available seating.

SUMMARY OF THE INVENTION

A vehicle seat according to a first embodiment of the invention includes a sitting portion connected to a backrest, as well as an armrest connected to either the sitting portion or the backrest. The armrest includes both an elastically deformable cushion material and a plastically deformable cellular structural material. The sitting portion and the backrest also include the plastically deformable cellular structural material. The cellular structural material comprises at least one hollow cell, and alternatively a plurality of hollow cells, having walls disposed generally perpendicular to the direction of force applied during a side-impact collision, whereby the cellular structural material absorbs energy as it is permanently deformed. In one variation the cell walls are preferably made from metal and are interconnected to form a honeycomb structure.

In another embodiment, the vehicle seat includes a generally horizontal sitting portion connected to a generally vertical backrest, and an armrest connected to the sitting portion of the backrest. A plastically deformable cellular structural material is arranged within at least one of the sitting portion, the backrest, and the armrest. The cellular structural material includes a plurality of hollow cells having walls disposed perpendicular to the direction of force applied during a side-impact collision, whereby the cellular structural material absorbs energy as it is permanently deformed. In a variation of this embodiment, the seat does have a connected armrest and both the sitting portion and the backrest include the cellular structural material.

Another embodiment of the invention includes an armrest for a vehicle seat with an elastically deformable cushion and a plastically deformable cellular structural material. The cellular structural material includes at least one hollow cell, and alternatively a plurality of hollow cells, disposed perpendicular to the direction of side-impact force applied during a collision, whereby the cellular structural material absorbs energy as it is permanently deformed. The cushion material may be formed generally contiguous with or at least partially enveloping the cellular structural material. In a variation of this embodiment a barrier is interposed between the elastically deformable cushion and a plastically deformable cellular structural material, whereby a localized force applied to the cellular structural material is dissipated radially through the barrier and applied to the cushion material over a greater area to reduce the force ultimately applied to the occupant.

The plastically deformable cellular structural material absorbs the energy of impact in a collision to thereby reduce or eliminate injury to occupants. Because the cellular structural material seat is incorporated within an existing seat or armrest structure, the energy-absorbing seat is aesthetically pleasing and readily adaptable to a variety of existing vehicle structures. Incorporation of cellular structural material into a vehicle seat requires minimal or no increase in cost when compared to presently available seating, while providing relative ease of installation and manufacture.

DETAILED DESCRIPTION

Figure 1:
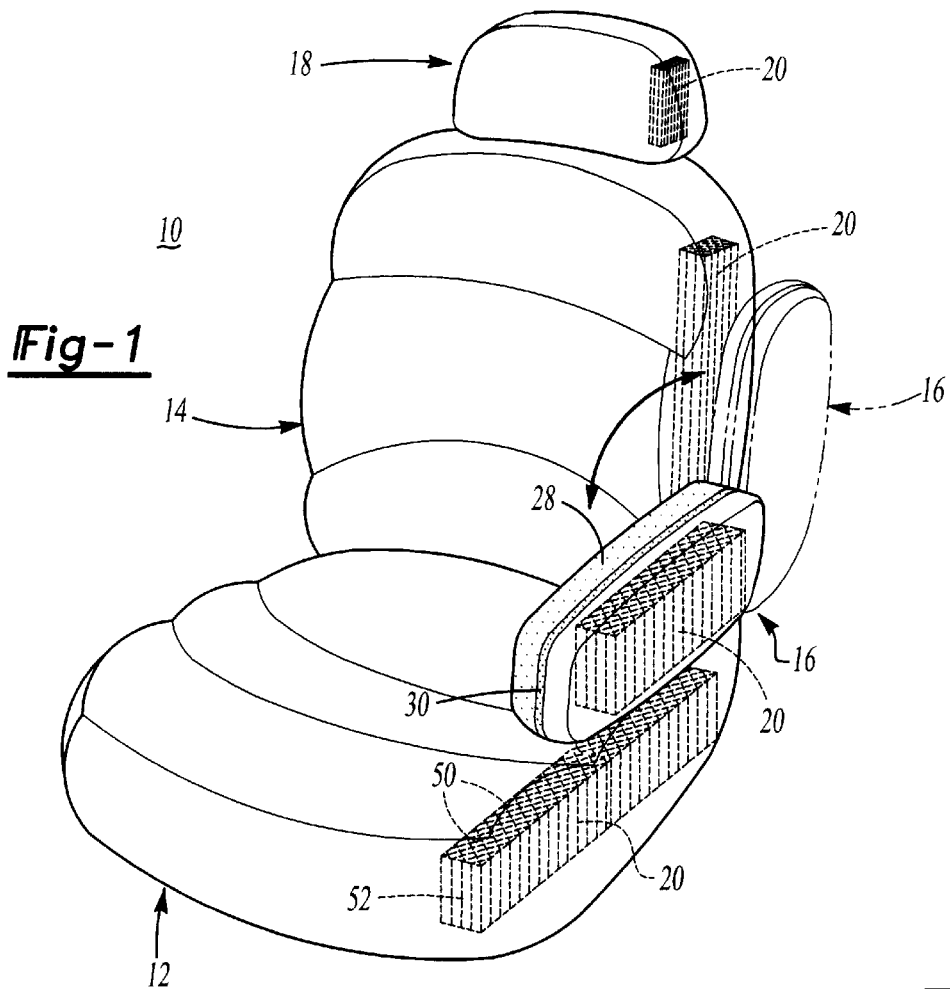
FIG. 1 is a partial perspective view of a vehicle seat according to one embodiment of the present invention.

An energy-absorbing vehicle seat 10 including plastically deformable cellular structural material 20 is shown generally in FIG. 1. Vehicle seat 10 includes a frame (not shown) supporting a generally horizontal sitting portion 12, a generally vertical backrest 14, an armrest 16, and a headrest 18, each preferably covered by upholstery 22. Preferably, headrest 18 is vertically adjustably mounted to the backrest 14, whereby headrest 18 can be raised or lowered relative backrest 14. Armrest 16 is preferably pivotally mounted to backrest 14 so that it may be adjusted from the generally horizontal orientation as shown in FIG. 1 perpendicular to the backrest to a generally vertical orientation (shown in phantom in FIG. 1) parallel to the backrest. Alternatively, armrest 16 is adjustably mounted to sitting portion 12. Further, backrest 14 may be pivotally mounted to sitting portion 12 at their adjacent ends, whereby the angle of inclination of the backrest relative the sitting portion can be adjusted to suit the comfort of an occupant. Also, the frame for seat 10 may be adjustably mounted to the vehicle such that seat 10 can be moved horizontally forward or rearward, or tilted, to suit the occupant's preference.

Seat portion 12 includes plastically deformable cellular structural material 20 disposed within seat 10. Cellular structural material 20 is preferably positioned within seat 10 along its outboard side, such that it is positioned between the occupant and a vehicle door (not shown). More specifically, cellular structural material 20 is preferably positioned between the seat frame and upholstery 22 on the outboard side of seat portion 12. Cellular structural material 20 alternatively is disposed throughout sitting portion 12 or along the forward, rearward, or inboard side of the interior of the sitting portion, incorporated as part of the seat frame to reduce overall material costs or as additional structure for strengthening the seat frame. Cellular structural material 20 deforms upon application of a force to seat portion 12 to absorb the energy of a collision, whereby a dissipated force is applied to the seat occupant.

In one variation of seat portion 12, as shown in FIG. 1, a barrier 30 is positioned contiguous with cellular structural material 20, thereby strengthening the cellular structural material to insure a more uniform deformation upon application of a force to the seat portion. Application of a force focused on only a section of seat portion 12 deforms cellular structural material 20 adjacent that section, but barrier 30 radiates that same force in the plane of the barrier to apply a less focused force to a larger area of seat 10 or its frame, whereby a more dissipated force is applied to the seat occupant.

Similarly, backrest 14 includes plastically deformable structural cellular material 20 extending at least along the interior of the outboard side of the backrest. With sitting portion 12, backrest 14 may include cellular structural material 20 throughout the backrest or along an upper, lower, or inboard portion of the interior of the backrest. Preferably, cellular structural material 20 is positioned between the seat frame and upholstery 22 on the outboard side of backrest 14. Alternatively, cellular structural material 20 may be incorporated as part of the seat frame to reduce overall cost or as additional structure to strengthen the seat frame. Upon application of a force to backrest 14 during a collision, cellular structural material 20 deforms to absorb the collision energy and dissipate the force applied to the seat occupant.

Similar to seat portion 12, backrest 14, as shown in FIG. 1, may include a barrier 30 positioned contiguous with cellular structural material 20, thereby strengthening the cellular structural material to insure a more uniform deformation upon application of a force to the backrest. As before, when a force is applied to only a small area of backrest 14, cellular structural material 20 in that area deforms more severely than the cellular structural material in adjacent areas. Barrier 30 radiates the applied force in the plane of the barrier to apply a less focused force to a larger area of seat 10 or its frame supporting the backrest, whereby a more dissipated force is applied to the seat occupant.

Headrest 18 also includes plastically deformable structural cellular material 20 disposed within the interior at least along the outboard side of the headrest. Cellular structural material 20 is preferably positioned between the headrest frame and upholstery 22 on the outboard side of headrest 18. Headrest 18 may include cellular structural material 20 throughout the headrest or along a top, bottom, or inboard portion of the interior of the headrest, incorporated as part of the headrest frame to save material costs or as additional structure to strengthen the headrest frame. As for seat portion 12 and backrest 14, headrest 18 may include barrier 30 to dissipate the energy of the collision in the plane of the barrier, whereby a less focused and more dissipated force is delivered to the seat occupant.

Armrest 16 includes plastically deformable cellular structural material 20 disposed therein, and preferably positioned within armrest 16 along its outboard side so as to protect the occupant. Alternatively, cellular structural material 20 is disposed throughout armrest 16 or along the forward, rearward, or inboard side of the interior of the armrest. Preferably, cellular structural material 20 is positioned between the armrest frame and upholstery 22 on the outboard side of armrest 16. As variations of this embodiment, cellular structural material 20 is incorporated as part of the armrest frame to reduce overall cost or as additional structure to strengthen the armrest frame.

Another embodiment of armrest 16, as best illustrated by FIG. 1, includes contiguous layers of plastically deformable cellular structural material 20 and elastically deformable cushion material 28, separated by barrier 30. Barrier 30 strengthens cellular structural material 20 to insure a more uniform deformation upon application of a force to armrest 16. Application of a force to only a portion of armrest 16 deforms cellular structural material 20 adjacent that portion, but barrier 30 radiates that same force in the plane of the barrier to apply a less focused force to a larger area of cushion material 28, whereby a more dissipated force is applied to the seat occupant.

While shown as a sandwich-type construction, it is not required that cushion material 28, cellular structural material 20, and barrier 30 abut or be contiguous with each other. Rather, cellular structural material 20 should be on the outboard side of armrest 16 while elastically deformable cushion 28 is on the inboard side of armrest 16 to provide cushion on those portions of the armrest that the occupant is likely to encounter in a collision. Barrier 30 should be positioned between cushion material 28 and cellular structural material 20 for energy radiating purposes, and may be abutting either the cushion material or the cellular structural material, or neither. Alternatively, armrest 16 does not include barrier 30, and cushion material 28 and cellular structural material 20 function together to dissipate the energy of a collision. Armrest 16, unlike sitting portion 12, backrest 14, and headrest 18, typically encounters the occupant with the force of a side impact as its use position (generally horizontal) places it between the occupant and the side of the vehicle. Thus, inclusion of elastically deformable cushion material 28 on the inboard side of armrest 16 provides a last energy-absorbing barrier before the force of the side impact is delivered to the occupant.

Preferably, cellular structural material 20 is positioned between the armrest frame and upholstery 22 on the outboard side of armrest 16. As variations of this embodiment, cellular structural material 20 is incorporated as part of the armrest frame to reduce overall cost or as additional structure to strengthen the armrest frame. For each variation, cushion material 28 can extend above, below, or about the front or rear edges of cellular structural material 20 to at least partially envelop the cellular structural material and provide an elastic energy-absorbing barrier.

Figure 2:
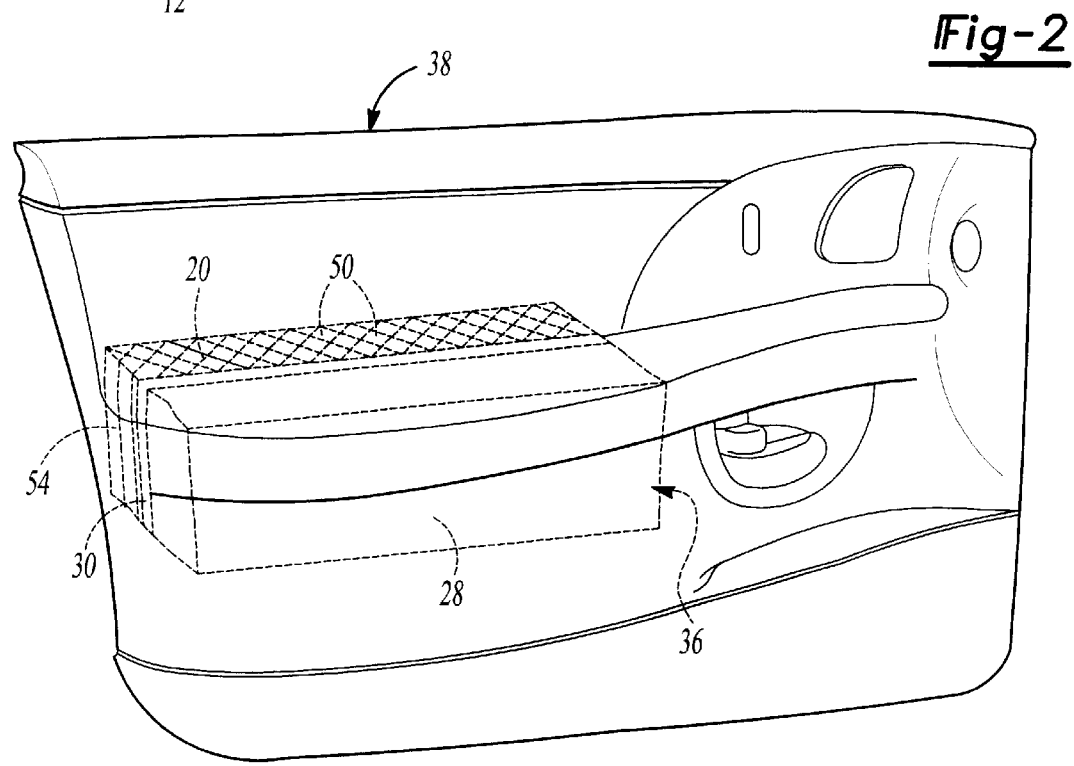
FIG. 2 is a partial perspective view of an armrest attached to a vehicle door according to another embodiment of the present invention.

An alternative embodiment of the invention is an armrest 36 attached to a vehicle door 38, shown in FIG. 2. Armrest 36 includes structural cellular material 20 disposed contiguously with elastically deformable cushion material 28. Similar to the prior embodiment, cellular structural material 20 is positioned on the outboard side of the vehicle relative the occupant and cushion material 28 is positioned between the structural cellular material and the occupant. Further, while structural cellular material 20 and cushion material 28 are shown generally contiguous, the cushion material may at least partially envelop the structural cellular material, particularly about those portions the occupant is likely to encounter during a collision. Thus, for example, the top surface of structural cellular material 28 in armrest 36 may be advantageously covered by cushion material 28.

Much like armrest 16 and as illustrated in FIG. 2, armrest 36 may include barrier 30 between contiguous layers of plastically deformable cellular structural material 20 and elastically deformable cushion material 28. Barrier 30 strengthens cellular structural material 20 to insure a more uniform deformation upon application of a force to armrest 36. Application of a force to only a portion of armrest 36 deforms cellular structural material 20 adjacent that portion, but barrier 30 radiates that same force in the plane of the barrier to apply a less focused force to a larger area of cushion material 28, whereby a more dissipated force is applied to the vehicle occupant.

An alternative embodiment of armrest 36 includes only plastically deformable structural cellular material 20 extending along the interior of the outboard side of the armrest. Similar to the prior embodiment, armrest 36 may include cellular structural material 20 throughout the backrest or along an upper, lower, or inboard portion of the interior of the armrest. Preferably, cellular structural material 20 is positioned between the armrest frame and upholstery 22 on the outboard side of armrest 36. As variations of this embodiment, cellular structural material 20 is incorporated as part of the armrest frame to reduce overall cost or as additional structure to strengthen the armrest frame. For each variation, cushion material 28 can extend above, below, or about the front or rear edges of cellular structural material 20 to at least partially envelop the cellular structural material and provide an elastic energy-absorbing barrier.

Cushion material 28 has been described specifically for use with armrests 16, 36, but may also be used with cellular structural material 20 for sitting portion 12, backrest portion 14, and headrest 24. For such embodiments, cushion material 28 can be contiguous with cellular structural material 20, as shown for armrests 16, or may be at least partially enveloping in that it extends about the top, bottom, or sides of the cellular structural material to provide a barrier of the cushion material about the cellular structural material on those surfaces likely to be encountered by the occupant during the collision.

Cellular structural material 20 comprises a plurality of hollow cells 50 defined by walls 52 disposed parallel to their longitudinal axis and having an open top and bottom. Hollow cells 50 are preferably oriented within seat 10 and armrests 16, 36 such that their longitudinal axis extends generally vertical and parallel to walls 52 defining the hollow cells. Further, walls 52, and thus cell longitudinal axes, are disposed generally perpendicular to the direction of side impact force applied during a collision. Hollow cells 50 are preferably interconnected by walls 52 to form a honeycomb, but are alternatively formed of individual cells defined by independent walls.

Cellular structural material 20, in one form, includes cladding 54, as shown best in FIG. 2, about the sides of the cellular structural material. Cladding 54 strengthens cellular structural material 20, and may provide a threshold strength that a force from a collision must exceed before the cellular structural material will deform. Cladding 54 is made of the same material as walls 52 defining cells 50, but can alternatively be made of a different material. Cladding 54, however, is not required for proper functioning of cellular structural material 20 and, as shown in FIG. 1, the cellular structural material can be used without it.

Cellular structural material 20 can vary in height, whereby the length of the longitudinal axis of the cells 50 is increased according to the required use. For example, cellular structural material 20 in backrest 14 includes cells 50 with a longitudinal axis of a greater length than the similar longitudinal axis of the cellular structural material disposed in sitting portion 12. Further, structural cellular material 20 can be formed as multiple sections disposed adjacent one another. For example, in place of a single cellular structural material 20 in backrest 14 shown in FIG. 1, multiple sections of cellular structural material, each having shorter longitudinal axis may be stacked vertically to substantially occupy the space occupied by the single cellular structural material shown. Similarly, cellular structural material 20 of sitting portion 12 can be replaced by multiple sections of cellular structural material aligned horizontally, each having cells 50 with longitudinal axes of generally the same length, but having shorter generally horizontal lengths, to generally occupy that space occupied by cellular structural material 20 in FIG. 1. The same modifications can be made to headrest 24, armrest 16, and armrest 36.

Structural cellular material 20 is preferably a plastically deformable material, and most preferably formed as hollow cells 50 defined by walls 52 interconnected to form a honeycomb. Walls 52 defining cells 50 are made of metal, plastic, carbon fiber, cardboard, or the like. Preferably, walls 52 are made of a lightweight metal, such as aluminum because of its relative strength to weight. Structured cellular material may be fabricated by any suitable process such as expansion, corrugation, or molding.

Cell geometry of the cellular structural material is designed to provide adequate open space to absorb the energy of a collision through deformation of walls 52, which is a function of both the deformation properties of the walls as well as the volume of cells 50. The thickness of cell walls 52 and the volume of cells 50 can vary across a wide range of values. Further, cells 50 can be of any shape, including diamond-shaped (as shown), hexagonal, spherical, or elliptical, among other shapes. A preferred embodiment has a cell wall thickness of approximately 0.010 millimeters and cell diameter is approximately 3–4 millimeters. For this preferred embodiment, cell geometry is hexagonal, and the material is aluminum.

While cellular structural material is shown in FIGS. 1 and 2 as a honeycomb with and without cladding, various cellular structural materials may be employed within seat portion 12, backrest 14, armrests 16, 36, and headrest 18. As shown in FIGS. 3 through 10, the variations for cell geometry range from multiple cells to a single cell and from rectilinear to arcuate cell walls.

Figure 3:
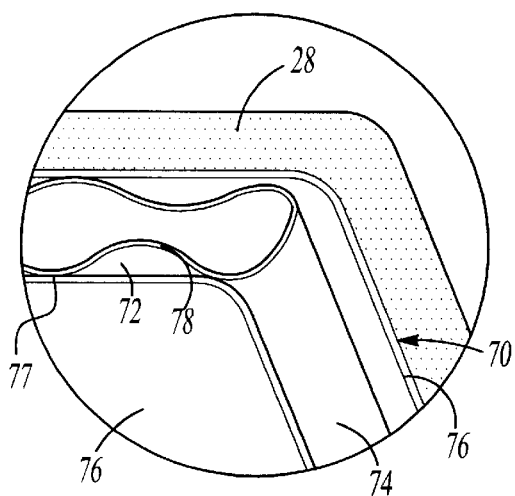
FIG. 3 is a partial perspective view of cellular structural material according to one variation of the invention.

As illustrated in FIG. 3, cellular structural material 70 is a single cell of generally waveform longitudinal walls 72 connected at their ends by arcuate end walls 74. Cladding 76 abuts longitudinal walls 72 of cellular structural material 70 and end walls 74 remain unclad, whereby upon complete deformation the cellular structural material may expand outwardly at the end walls to dissipate collision energy.

Further, via the unclad end walls 74, collapsion of the outboard cladding relative the inboard cladding occurs perpendicular to the direction of force by lateral movement as well as parallel by deformation of interposed cellular structural material 70. The waves of walls 72, defined conventionally by peaks 77 and troughs 78, function to control deformation. The troughs 78, as deformation initiators, permit initial deformation when a force is transmitted to peaks 77 through abutting cladding 76. Secondarily, after opposed troughs 78 abut through completion of intial deformation, each pair of opposed peaks 77 commence deformation toward one another. Complete secondary deformation results in opposed peaks 77 abutting, whereupon excess cellular structural material 70 expands outwardly at end walls 74. Cushion material 28, illustrated in abutment to cellular structural material 70, dissipates remaining collision energy through elastic deformation.

Figure 4:
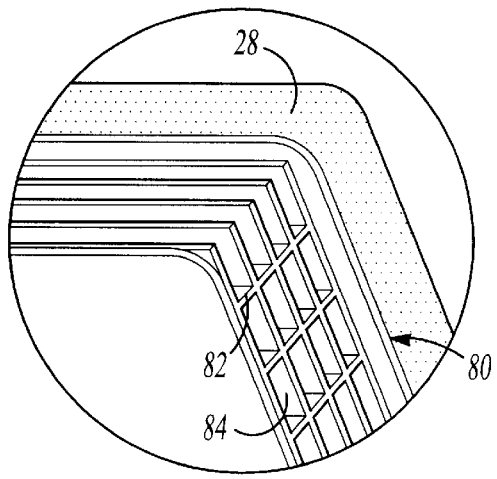
FIG. 4 is a partial perspective view of cellular structural material according to another variation of the invention.

FIG. 4 depicts cellular structural material 80, which includes interconnected walls 82 forming rectangular cells 84, and is otherwise similar to cellular structural material 20, described above. As before, deformation of cells 84 dissipates the collision energy to reduce the force delivered to the occupant. Barrier 30 is positioned between cushion material 28 and cellular structural material 80 to radially dissipate a localized collision force as explained above.

Figure 5:
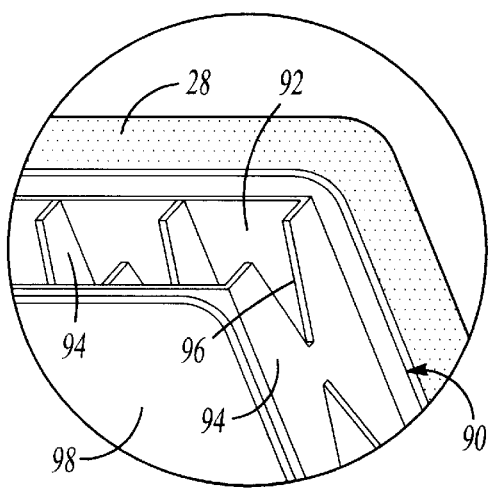
FIG. 5 is a partial perspective view of cellular structural material according to a further variation of the invention.

Cellular structural material 90, as shown in FIG. 5, includes aligned cells 92 separated by relieved walls 94 connected by opposed outer walls 98. Relieved walls 94 include wedge-shaped openings 96 that function as deformation initiators. Upon application of a collision force to outer walls 98, cells 92 absorb the collision energy through deformation of relieved walls 94 along a longitudinal center line as defined by deformation initiating openings 96. Thus, walls 94 deform inwardly or outwardly of cell 92 depending upon the direction of the initial collision force. Other shapes for the openings 96 are possible, such as ovals, ellipses, rectangles, and the like, as long as the particular shape functions to initiate deformation in a predetermined manner. As explained previously, cushion material 28 elastically deforms to dissipate energy from the collision force not absorbed by cellular structural material 90.

Figure 6:
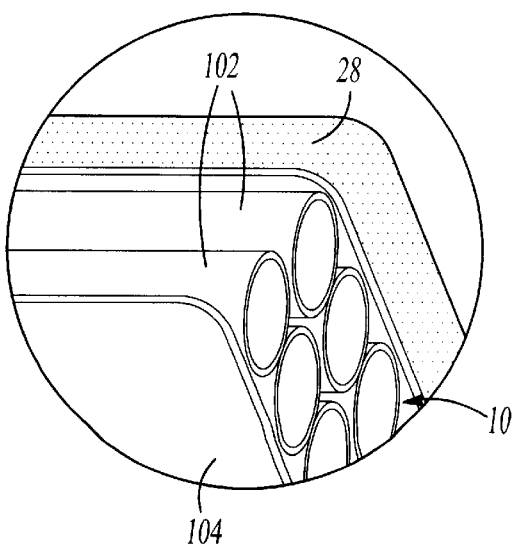
FIG. 6 is a partial perspective view of cellular structural material according to another variation of the invention.

Cellular structural material 100 is illustrated in FIG. 6 and includes a series of aligned tubes 102. While shown stacked two deep, cellular structural material 100 can include a single row of tubes 102, or can include from 3 to 20 or more rows of tubes depending on the particular use and the diameter of the tubes. Further, while shown aligned in both directions, tubes 102 may be offset in one or both directions such that an adjacent tube is positioned in the open space between adjacent tubes, resulting in a more densely packed cellular structural material. Cladding 104, disposed along forward and rearward longitudinal surfaces of the cellular structural material 100, secures aligned tubes 102 together. Unclad sides of cellular structural material 100 allows expansion of the cellular structural material laterally during absorption of collision energy through deformation of tubes 102, as well as movement of the outboard cladding in directions perpendicular and parallel to a side-impact force. Cushion material 28, illustrated in abutment to cellular structural material 100, dissipates remaining collision energy through elastic deformation.

Figure 7:
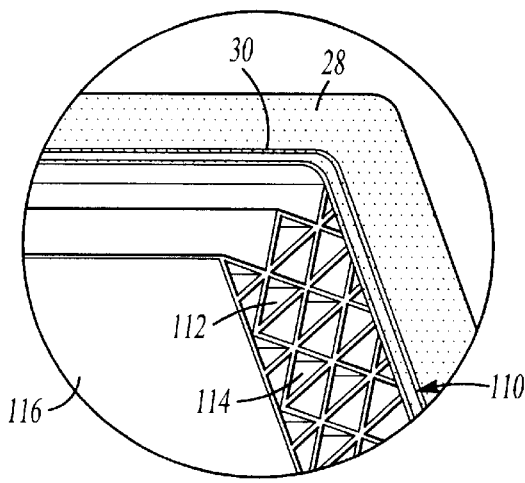
FIG. 7 is a partial perspective view of cellular structural material according to one variation of the invention.

FIG. 7 illustrates cellular structural material 110, which includes interconnected walls 112 defining triangular cells 114. Similar to cellular structural material 20, a reinforcing interconnecting wall dissects otherwise rectangular cells to form a strengthened cellular structural material, whereby a greater resistance to deformation is achieved. Cellular structural material 110 includes cladding 116 on its longitudinal front and rear surfaces and is open on its top, bottom and side surfaces. During deformation upon application of a collision force, cladding 116 strengthens the front and rear surfaces and the lack of cladding on the sides encourages deformation forces to extrude collapsed cellular structural material 110 laterally. Further, a barrier 30 is positioned between cellular structural material 110 and cushion material 28, further encouraging radial dissipation of a collision force directed to a localized portion of the cellular structural material, as discussed more fully above.

Figure 8:
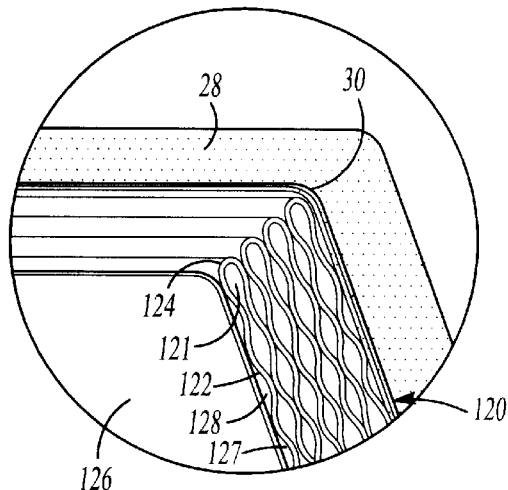
FIG. 8 is a partial perspective view of cellular structural material according to another variation of the invention.

Structural cellular material 120, as depicted in FIG. 8, includes multiple cells 121 each having generally waveform longitudinal walls 122 connected at their ends by arcuate end walls 124. The waves of walls 122, defined conventionally by peaks 127 and troughs 128, function to control deformation. Cells 121 are stacked so as to abut at adjacent peaks 127, whereby longitudinal walls 122 of each cell mirrors the adjacent longitudinal wall. Cladding 126 abuts an outboard side longitudinal wall 122 of cellular structural material 120 and end walls 124 remain unclad, whereby upon complete deformation the cellular structural material may expand outwardly at the end walls to dissipate collision energy. The unclad side also permits movement of the outboard cladding in a direction perpendicular as well as parallel to a side-impact force. Troughs 128, as deformation initiators, permit deformation when a force is transmitted to peaks 127, intially through cladding 126 abutting the most outboard cell 121. The force is transmitted from the outboard-most cell 121 to adjacent cells 121. After opposed troughs 128 abut through completion of intial deformation cells 121, each pair of opposed peaks 127 commence deformation toward one another. Complete secondary deformation of any cell 121 results in opposed peaks 127 abutting, whereupon excess cellular structural material 120 expands outwardly at end walls 124. Cushion material 28 dissipates remaining collision energy through elastic deformation. Also, as explained more fully above, barrier 30 is positioned between cushion material 28 and cellular structural material 120 to radially dissipate a localized collision force as explained above.

Figure 9:
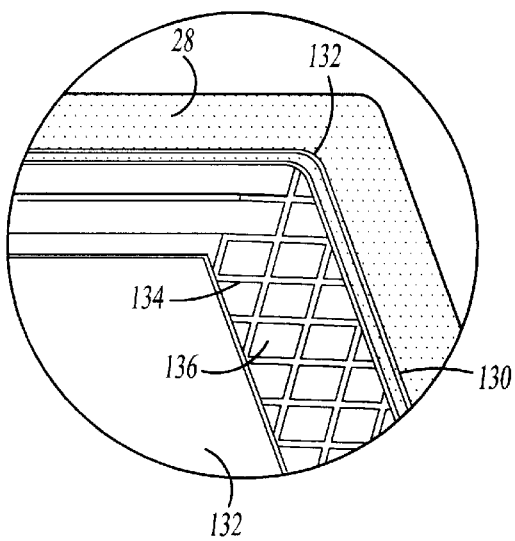
FIG. 9 is a partial perspective view of cellular structural material according to a further variation of the invention.

Cellular structural material 130, shown in FIG. 9, is similar to cellular structural material 20 describe above in cell geometry, except that cellular structural material 130 includes cladding 132 on its longitudinal front and rear surfaces and is open on its top, bottom and side surfaces. During deformation upon application of a collision force, cladding 132 strengthens the front and rear surfaces and the lack of cladding on the sides encourages lateral deformation whereby the outboard cladding moves perpendicular to a side-impact force. Further, the angle of interconnected walls 134 defining cells 136 encourages deformation by collapse of cells 136 such that the outboard surface of cladding 132 moves laterally relative the inboard surface of cladding 132. Cushion material 28 deforms elastically to absorb collision energy not absorbed by cellular structural material 130.

Figure 10:
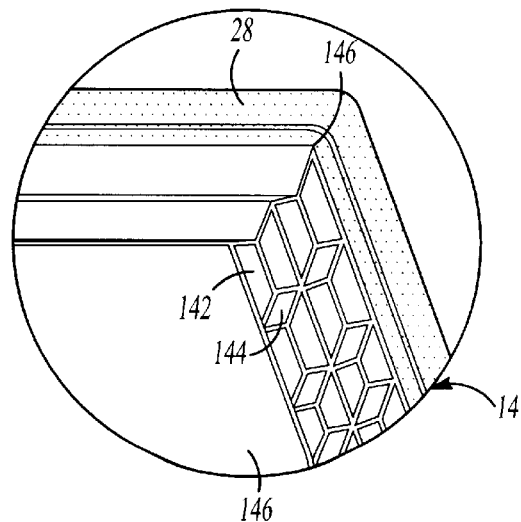
FIG. 10 is a partial perspective view of cellular structural material according to on variation of the invention.

Cellular structural material 140, illustrated in FIG. 10, includes aligned rows of trapezoidal cells 142 separated by generally diamond-shaped cells 144 stacked longitudinally. As shown, shorter parallel sides of each trapezoidal cell abut an adjacent shorter parallel side of another trapezoidal cell. Similarly, longer parallel sides of each trapezoidal cell abut an adjacent longer parallel side of another trapezoidal cell. During deformation upon application of a collision force, cladding 146 strengthens the front and rear surfaces and the lack of cladding on the sides encourages deformation forces to extrude collapsed cellular structural material 140 in that direction. Cushion material 28 further dissipates collision force energy not absorbed by the cellular structural material.

In the following descriptions cellular structural material 20 is used as an example of cellular structural material without limitation. Thus, any structural cellular material, such as those discussed previously herein, can be substituted for our specific example of cellular structural material 20.

Elastically deformable cushion material 28, such as that shown in FIG. 2 for armrest 36 and in FIG. 1 for armrest 16, is preferably a foamed plastic. While cushion material 28 can be open- or closed-celled, it is preferred to use a material having deformability of approximately 2500 psi, density of approximately 4.5 pcf, and energy absorption of approximately 86 percent upon a 15 mph impact. Further, as discussed above, cushion material 28 can be used in a contiguous or partially enveloping relationship to cellular structural material 28 in sitting portion 12, backrest 14, and headrest 18. Additionally, the relationship volume of cellular structural material to elastically deformable cushion material can vary depending upon space allowed for the particular use and the amount of cushion desired. While depicted in FIGS. 1 and 2 using an approximately 1:1 ratio of cellular structural material 20 to cushion material 28, the amount of cushion material can be increase substantially for other uses, such as in sitting portion 12, backrest 14, or headrest 18, to provide greater comfort to the occupant. Further, the limited amount of space provided within armrests 16, 36 may require that cushion material 28 be reduced relative cellular structural material 20 due to a need for an increased volume in the cellular structural material relative the cushion material to protect the occupant.

Cellular structural material 20 is disposed within an outboard portion of sitting portion 12, backrest 14, and armrests 16, 36, and aesthetically hidden by upholstery 22. Upholstery 22, forming the outer skin of the seat 10 and armrests 16, 36, is preferably of soft material such as leather, vinyl, or plastic. Preferably, barrier 30 is made of plastic, but can also be made of metal, carbon fiber, cardboard, or the like.

Vehicle seat 10 with plastically deformable cellular structural material 20 absorbs the energy of impact in a collision to thereby reduce or eliminate injury to occupants. Specifically, energy-absorbing vehicle seat 10 provides protection to the pelvis, abdomen, and thorax of the occupant. During a collision with an essentially side-loading impact, or even a side-loading component, after initial energy has been dispersed by the door and general vehicle structure, cellular structural material 20 progressively continues to disperse the remaining energy. Where used, barrier 30 radiates a localized force outwardly to dissipate the energy over a larger area of cushion material. The cushion material completes the energy dissipation in the areas contacting the occupant. The net resulting force exhibits a lower peak acceleration of the seat, and therefore the occupant, during impact. The armrest 16, 36 and headrest 18 further provide protection to the appendages and head of the occupant, in addition to the pelvis, abdomen, and thorax.

Because cellular structural material 20 is incorporated within the existing seat structure, the energy-absorbing seat or armrest is aesthetically pleasing and readily adaptable to a variety of existing vehicle structures. Incorporation of cellular structural material into the seat or armrest requires minimal or no increase in cost when compared to presently available seating, while maintaining relative ease of installation and manufacture.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicle seat, comprising a generally horizontal sitting portion connected to a generally vertical backrest, and an armrest connected to at least one of said sitting portion and said backrest, at least of one of said sitting portion, said backrest, and said armrest including a plastically deformable cellular structural material arranged therein, said cellular structural material including at least one hollow cell having an open top and bottom and generally vertical walls disposed generally perpendicular to the direction of a side-impact force applied to the vehicle seat during a vehicle collision, whereby said cellular structural material absorbs energy as it is permanently deformed during a collision.

2. A vehicle seat according to claim 1 wherein said cellular structural material is disposed on an outboard side of said vehicle seat so as to be positioned adjacent to a vehicle door.

3. A vehicle seat according to claim 1 wherein said at least one hollow cell is multiple hollow cells interconnected to form a honeycomb.

4. A vehicle seat according to claim 3 wherein said cellular structural material includes cladding surrounding said plurality of hollow cells on at least two sides.

5. A vehicle seat according to claim 3 wherein said walls are fabricated of lightweight metal of approximately 0.010 millimeters thickness and said cells have a diameter of approximately 3–4 millimeters.

6. A vehicle seat according to claim 1 wherein said at least one of said sitting portion and said backrest is both said sitting portion and said backrest.

7. A vehicle seat according to claim 6 wherein said cellular structural material is disposed on the outboard side of said vehicle seat as to be positioned adjacent to a vehicle door.

8. A vehicle seat according to claim 7 wherein said at least one hollow cell is multiple hollow cells interconnected to form a honeycomb.

9. A vehicle seat according to claim 8 wherein said cellular structural material includes cladding surrounding the plurality of hollow cells on at least two sides.

10. A vehicle seat according to claim 8 wherein said walls are fabricated of lightweight metal of approximately 0.010 millimeters thickness and said cells have a diameter of approximately 3–4 millimeters.

11. An arm rest for a vehicle seat, comprising an elastically deformable cushion material and a plastically deformable cellular structural material, said cellular structural material including at least one hollow cell having an open top and bottom and generally vertical walls disposed perpendicular to the direction of a side-impact force applied during a vehicle collision, whereby said walls deform within an open space formed by said hollow cell so as to absorb energy as said walls are deformed during a collision, said elastically deformed cushion material serving to further absorb energy, in addition to said cellular structal material, created from a side impact force cause by a collision.

12. An armrest for a vehicle seat according to claim 11 wherein said armrest is attached to a vehicle door adjacent the seat.

13. An armrest for a vehicle seat according to claim 11 wherein said armrest is adapted to be attached to said vehicle seat.

14. An armrest for a vehicle seat according to claim 11 wherein said cellular structural material is disposed on an outboard side of said cushion material so as to be positioned adjacent to a vehicle door.

15. An armrest for a vehicle seat according to claim 11 wherein said elastically deformable cushion material is a foamed plastic material.

16. An armrest for a vehicle seat according to claim 11 wherein said cellular structural material is disposed substantially contiguous to said elastically deformable cushion material.

17. An armrest for a vehicle seat according to claim 11 further comprising a barrier interposed between said cellular structural material and said elastically deformable cushion material, wherein upon deformation of said cellular structural material, said barrier is subjected to the side-impact force and radiates the side-impact force substantially across a plane of said barrier to dissipate the energy from the side-impact force over a larger area of said cushion material.

18. An armrest for a vehicle seat according to claim 11 wherein said at least one hollow cell is a plurality of hollow cells interconnected to form a honeycomb.

19. An armrest for a vehicle seat according to claim 18 wherein said cellular structural material includes cladding surrounding said plurality of hollow cells on at least two sides.

20. An armrest for a vehicle seat, comprising a plastically deformable cellular structural material, said cellular structural material including at least one hollow cell having an open top and bottom and generally vertical walls disposed perpendicular to a direction of a side-impact force applied during a vehicle collision, whereby said walls deform within an open space formed by said hollow cell so as to absorb energy during a collision; and a semi-rigid barrier positioned adjacent to said cellular structural material such that said cellular structural material is positioned on an outboard side of said barrier, wherein said barrier radiates the side-impact force of the collision across a plane of the said barrier to produce a more uniform deformation of said cellular material and to apply a less focused force to a seat occupant.

21. An armrest for a vehicle seat according to claim 20, wherein said barrier is sized to substantially extend across the entire length and width of said cellular structural material.

22. An armrest for a vehicle seat according to claim 20 further including a cushion material positioned adjacent to and on an inboard side of said barrier, wherein said barrier applies said less focused force to said cushion material and said cushion material absorbs a portion of said impact force to apply a dissipated force on said vehicle occupant.

* * * * *

UNITED STATES PATENT AND TRADEMARK OFFICE
CERTIFICATE OF CORRECTION

PATENT NO : 6,142,563

DATED : November 7, 2000

INVENTOR(S) : John A. Townsend, et al.

It is certified that error appears in the above-identified patent and that said Letters Patent are hereby corrected as shown below:

Col. 10, line 35
  replace "on the outboard"
  with --on an outboard--.

Col. 10, line 36
  replace "seat as"
  with --seat so as--.

Col. 10, line 57
  replace "deformed"
  with --deformable--.

Col. 10, line 58
  replace "structal"
  with --structural--.

Signed and Sealed this

Twenty-ninth Day of May, 2001

Attest:

NICHOLAS P. GODICI

*Attesting Officer*   *Acting Director of the United States Patent and Trademark Office*